(12) United States Patent
Buchmann

(10) Patent No.: US 10,176,230 B2
(45) Date of Patent: Jan. 8, 2019

(54) SEARCH-INDEPENDENT RANKING AND ARRANGING DATA

(71) Applicant: SAP SE, Walldorf (DE)

(72) Inventor: Daniel Buchmann, Walldorf (DE)

(73) Assignee: SAP SE, Walldorf (DE)

( * ) Notice: Subject to any disclaimer, the term of this patent is extended or adjusted under 35 U.S.C. 154(b) by 603 days.

(21) Appl. No.: 14/864,672

(22) Filed: Sep. 24, 2015

(65) Prior Publication Data

US 2017/0091187 A1    Mar. 30, 2017

(51) Int. Cl.
*G06F 17/30* (2006.01)
*G06F 3/0484* (2013.01)

(52) U.S. Cl.
CPC ...... *G06F 17/3053* (2013.01); *G06F 3/04842* (2013.01); *G06F 17/30554* (2013.01); *G06F 17/30696* (2013.01); *G06F 17/30702* (2013.01); *G06F 17/30867* (2013.01)

(58) Field of Classification Search
CPC .......... G06F 17/3053; G06F 17/30554; G06F 17/30867; G06F 17/30696; G06F 17/0702; G06F 3/04842
USPC .......................... 707/723, 999.005, 999.007
See application file for complete search history.

(56) References Cited

U.S. PATENT DOCUMENTS

2002/0042793 A1* 4/2002 Choi ................. G06F 17/30687
2003/0216870 A1* 11/2003 Wolber .................. G06F 19/20
                                                              702/27
2008/0016053 A1* 1/2008 Frieden ............. G06F 17/30864

* cited by examiner

*Primary Examiner* — Dung K Chau
(74) *Attorney, Agent, or Firm* — Fish & Richardson P.C.

(57) ABSTRACT

Various embodiments of systems and methods for a search-independent ranking and arranging data are described herein. Initially a rank value computation data is received. The rank value computation data is then forwarded to a database engine for computing rank values corresponding to an object type. The computation of rank values is independent of receiving the search query. Finally the data values corresponding to the object type are arranged based on the computed rank values.

20 Claims, 7 Drawing Sheets

Stimulated Search Results

Stimulate Selected Dimensions only (My preferred employees)

Search (leave empty for all records)

| Change | Rank | Title | WhyFor |
|---|---|---|---|
| ▲ | 65,9% | Nam Kim | |
| ▲ | 34,1% | Crispin Perez | |
| ▲ | 0,0% | Anna Lerch | |
| ▲ | 0,0% | Peter Douglas | |
| ▲ | 0,0% | Peter Fuchs | |
| ▲ | 0,0% | Karl Kessler | |
| ▲ | 0,0% | Nora Dwyer | |
| ▲ | 0,0% | Richard Fischer | |
| ▲ | 0,0% | Carol Aranda | |
| ▲ | 0,0% | Felicity Chang | |
| ▲ | 0,0% | Yoshiro Kimura | |

Advanced View                                    Show More
Number of Hits:51

Remove Details +
Reset Changes   List Changes Review and Apply

FIG. 6

SEARCH-INDEPENDENT RANKING AND ARRANGING DATA

FIELD

Embodiments generally relate to computerized data processing means or steps for organizing and inter-relating data files (e.g., relational, object-oriented, hierarchical, entity-relational models, and data management systems categorized as data warehouses).

BACKGROUND

A large amount of electronic documents are available throughout organizations and on the Internet. There are different types of search solutions, for example, a search application solution that allows a user to search this available data. Before a search result are presented to a user the search results obtained after a search are to be arranged based on certain influencing parameters. Typically the search results are arranged in a cascading manner. For example, in a cascading based arrangement of search results the search results are first arranged based on a first influencing parameter, the arranged search results are then re-arranged based on a second influencing parameter and the process is continued till the last rank influencing parameter.

One of the issues with a cascading based arrangement is that a search result having a lower value for a first influencing parameter would always be ranked lower than other search results irrespective of the values of other influencing parameters for the search result. Thus in the cascading based arrangement, the arrangement of search results is not based on values of all the influencing parameters but only a few of the influencing parameters, which is undesirable.

BRIEF DESCRIPTION OF THE DRAWINGS

The claims set forth the embodiments with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

FIG. 6 is a screenshot of a user interface displaying employee names arranged based on rank value computation data of FIG. 5, according to an embodiment

DETAILED DESCRIPTION

Embodiments of techniques for search independent ranking and arranging data are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
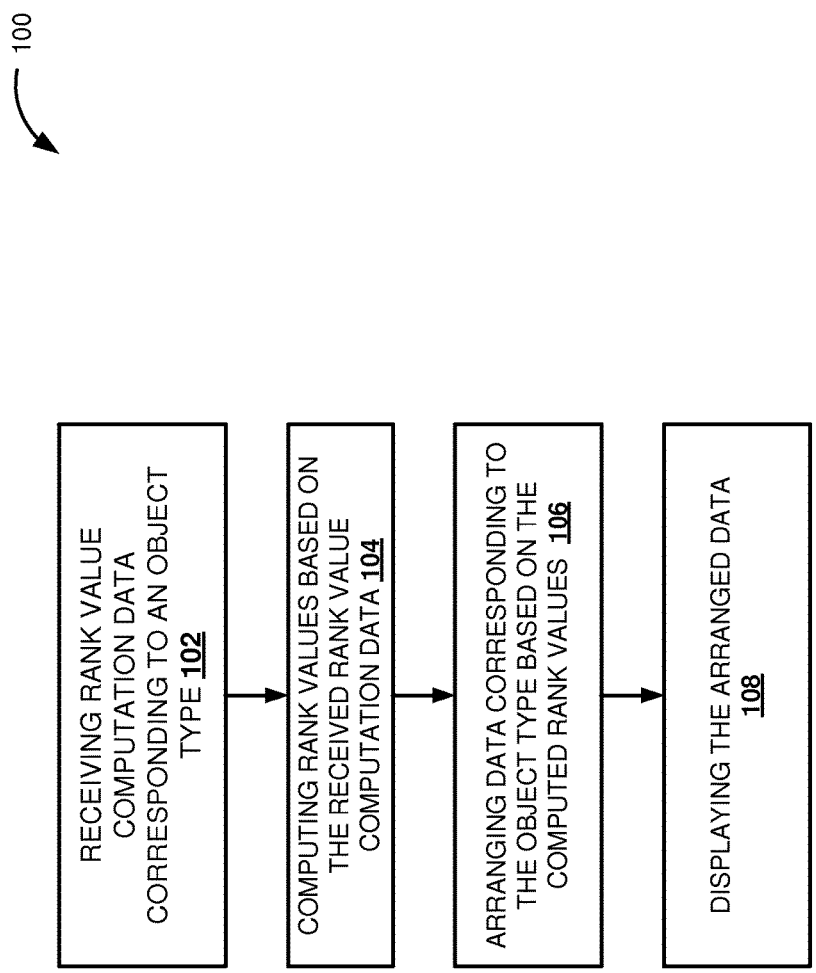
FIG. 1 is a flow diagram illustrating a process for search independent ranking and arranging data, according to an embodiment.

FIG. 1 is a flow diagram 100 illustrating a process 100 for search independent ranking and arranging data, according to an embodiment. Ranking is a process to define relationship between a set of items such that, for any two items, the first item is either 'ranked higher than', 'ranked lower than' or 'ranked equal to' the second item. The ranking may be represented by a rank value, where a first item with a higher rank value is ranked higher than a second item with a lower rank value. For example, when the rank value of an employee 1 is 0.7 and a rank value of an employee 2 is 0.3 then employee 1 is ranked higher than employee 2. In one embodiment, the rank values are used to arrange data stored in a database. Arranging data is the process of positioning data in an ordered list. In one embodiment, the data is arranged based on rank values, such that data value that has a higher rank value is positioned ahead of data value that has a lower rank value.

Initially a rank value computation data corresponding to an object type is received (102). An object type is a data type that encapsulates a data structure along with the functions and procedures needed to manipulate the data. For example, sales order is an object type that encapsulates several sales order data and also procedures to manipulate the sales order data. In one embodiment, the object type may be implemented as a database view or a database table. A database view is a virtual table based on a result set of a database query.

The received rank value computation data includes several rank influencing parameters and relative weights of these parameters. Rank influencing parameters are parameters that influence rank value for a particular object type. For example, an object type "sales" may have a corresponding rank value computation data that includes rank influencing parameters "demand of goods" and "available stock of goods". The rank influencing parameters "demand of goods" and "available stock of goods" affect the rank values for the "sales" object type. In one embodiment, the rank influencing parameters are a group of conditions. For example, a rank influencing parameter may be "employee name=Dan". In this case, an employee with a name "Dan" would have their rank value influenced by this rank influencing parameter.

The different rank influencing parameters may be assigned a relative weight that defines a relative influence of a particular rank influencing parameter, on the rank value with respect to another relative influencing parameter. For example, the relative weight for the rank influencing parameter "demand of goods" corresponding to a "sales" object type is 0.8 and the relative weight for the rank influencing parameter "available stock of goods" corresponding to a "sales" object type is 0.6. The weight indicates that the rank influencing parameter "demand of goods" has more influence on the rank value of the "sales" object type then the rank influencing parameter "available stock of goods".

Next rank values are computed based on the received rank value computation data (104). In one embodiment, the rank value is computed by aggregating the relative weights of the different rank influencing parameters. The rank value is computed for data values, in the database, corresponding to the object type. For example, when the rank value computation data is for an "employee" object type then the rank values are computed for data values corresponding to the "employee" object type.

The computation of the rank value may be triggered, for example, when a user logs to a client system. A client system may include, for example, desktop computers, a cellular or satellite telephones, laptop computers, personal digital assistants, electronic book readers, wearable devices such as wristbands, smart watches, intelligent eyewear, etc. In one embodiment, the client system may be a search application system, for example, an enterprise search system provided by SAP SE™. A search application is the practice of making content from multiple enterprise-type sources, such as databases and intranets, searchable to a user. A user may be mapped to a particular rank value computation data. When the system detects that the user is logged in then computation of rank value may be triggered based on the rank value computation data mapped to the user. For example, a user A may be mapped to a rank value computation data for an "employee" object type. In this case, when the user logs into the enterprise system then the database engine receives the rank value computation data for the "employee" object type and then computes the rank values for the "employee" object type. A database engine is a software component used to perform different operations, for example, read data from a database.

Next the data corresponding to the object type is arranged based on the computed rank values (106). In one embodiment, the data is arranged such that data values having higher rank value is positioned ahead of a data with a lower rank. Finally the arranged data is displayed on the client system (108). As the computation of rank value and the arrangement is based on the same rank value computation data, which are mapped to different users, and not dependent on any search query the displayed data values are arranged in the same order for different users. For example, a user 1 and user 2 are mapped to same rank value computation data that determines rank values of "employee" object type. When the user 1 and user 2 logs into a client system same rank values would be computed for the "employee" database as these values are computed from the same rank value computation data mapped to these users. Further as the computed rank values based on which the "employee" data is arranged are same, the "employee" data, displayed to user 1 and user 2, are arranged in same order. This ensures that different users access the data arranged in same order.

In one embodiment, the database engine computes the rank value in a non-cascading manner. Computing the rank value in a non-cascading manner ensures that the computed rank values and therefore the arrangement of the data is based on all the rank influencing parameters and not based on individual weights of the different rank influencing parameters. For example, consider a data 1 that has a rank value computation data including two data influencing parameters, parameter 1 having weight 0.2 and parameter 2 having weight 0.6, and a data 2 that has a rank value computation data including two data influencing parameters, parameter 3 having weight 0.4 and parameter 4 having weight 0.3. In this case, assume that the computed rank value of data 1 based on the rank value computation data is 0.8 and the computed rank value of data 2 based on the rank value computation data is 0.7. As the rank values are computed in a non-cascading manner, the data 1 that has a greater rank value is positioned ahead of data 2 in the arranged data, even though the weight (0.2) of first parameter (parameter 1) related to data 1 is less than the weight of the first parameter (parameter 3) of data 2.

Figure 2:
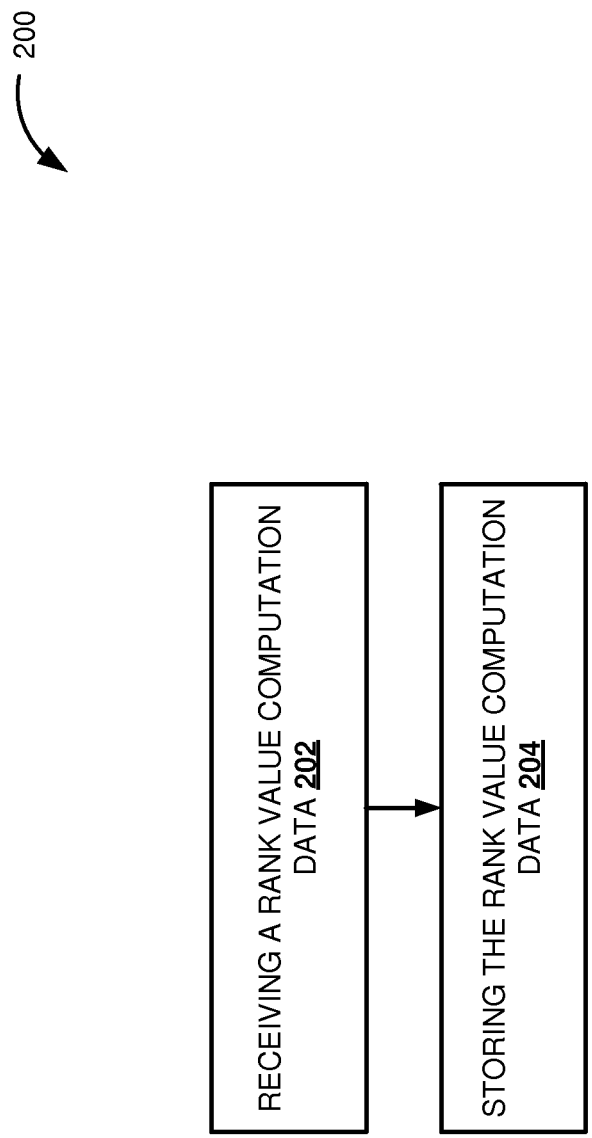
FIG. 2 is a flow diagram illustrating a process to store the rank value computation data, according to an embodiment.

FIG. 2 is a flow diagram illustrating a process 200 to store rank value computation data, according to an embodiment. The rank value computation data may include several rank influencing parameters and relative weights of the rank influencing parameters. Initially, a rank-value computation data may be received (202). The rank value computation data may be received for a particular object type. For example, a rank value computation data corresponding to an object type "employee" may include rank influencing parameter "sales order by customer name" and a corresponding weight 0.8. In one embodiment, the rank influencing parameter may be further defined to provide a sub-rank influencing parameters and a corresponding weight. For example, the "sales order by customer name" rank influencing parameter may be further defined to include a sub-rank influencing parameter "Customer 1" and weight 0.7. The rank influencing and the sub-rank influencing parameters with the corresponding weights are together used to compute the rank values. In one embodiment, the rank value computation data may be received at a user interface of a client system.

The rank influencing parameters included in the rank value computation data may either be search-independent rank influencing parameters or a search-dependent rank influencing parameters. Search-independent rank influencing parameters are parameters related to an object type that are not influenced by a search query. The search-independent rank influencing parameter may include, for example, parameters related to the object type, parameters related to a user profile, parameters related to a user's interaction history, etc. Parameters related to object type may include, for example, status of object type, number of object types related to a particular object type, etc. Parameters related to user profile or a user interaction history may indicate a user's personal preference or a user's action in a particular condition.

The search-dependent rank influencing parameters are parameters that are dependent on data in a received search query. A search query is information that a user provides to retrieve information. It may include a simple text query or a complex query written in a query language, for example, a sequential query language (SQL). In one embodiment, the search-dependent rank influencing parameter may be based on the data of the object type matching a search query. The search-dependent rank influencing parameters may include, for example, attribute weights, or term frequency-inverse document frequency (tf-idf). Tf-idf is a numerical statistic that is intended to reflect the importance of a word to a document in a collection or corpus. The tf-idf value increases proportionally to the number of times a word appears in the document, but is offset by the frequency of the word in the corpus. In one embodiment, the search-dependent rank influencing parameters are processed after a search query is received. For example, a search-dependent influencing parameter that is based on determining Tf-Idf value of a search term included in a search query may be processed only after a search query including the search term is received. The received rank value computation data is then stored (204). The received rank value computation data may be stored in a rank value computation data store.

Figure 3:
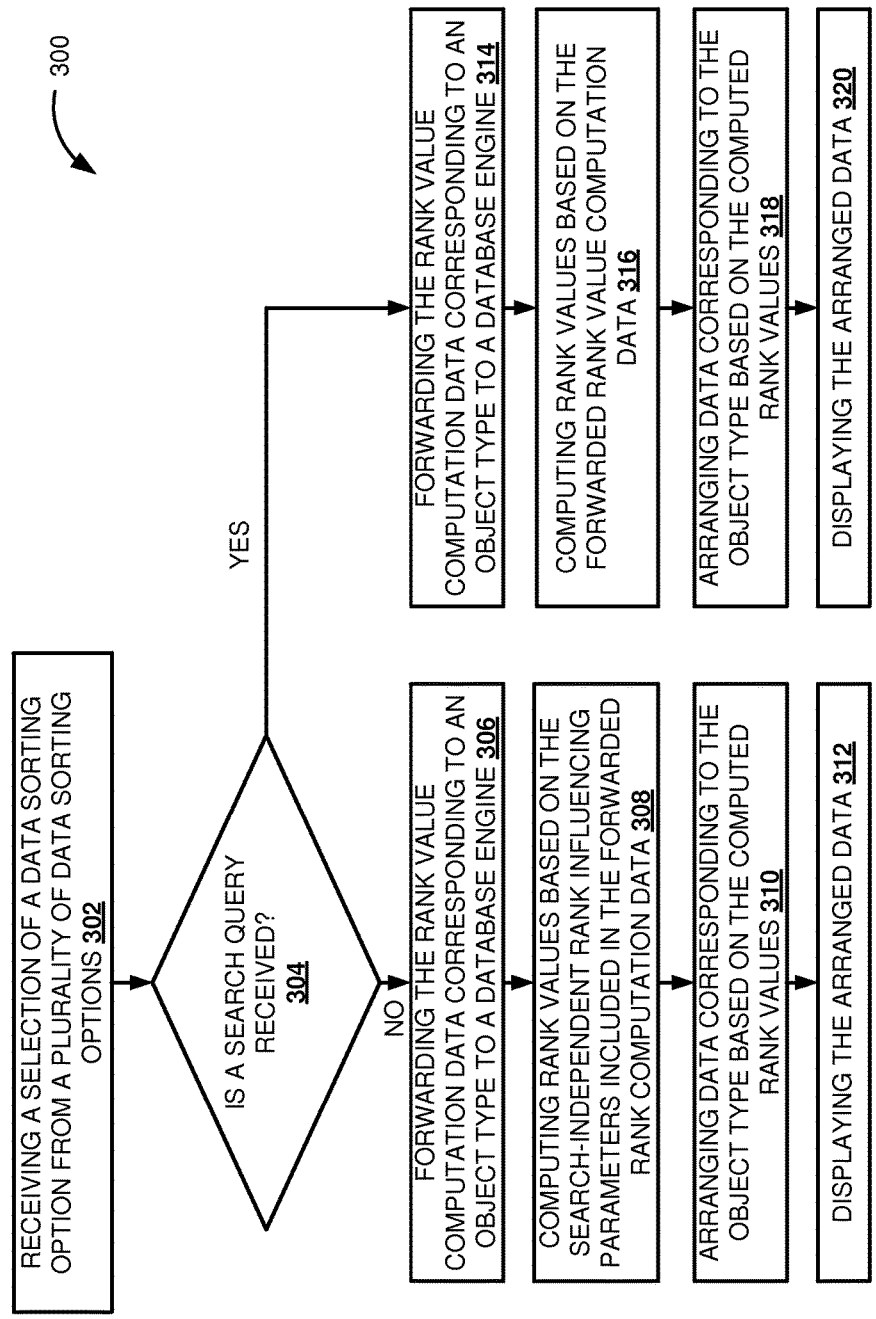
FIG. 3 is a flow diagram illustrating a process for search independent ranking and arranging data, according to an embodiment.

FIG. 3 is a flow diagram 300 illustrating a process for search independent ranking and arranging data, according to an embodiment. Initially a selection of data sorting option is received from a plurality of data sorting options (302). A data sorting option defines the way data corresponding to an object type is to be sorted before presenting it to a user. Sorting is the process of arranging data in a particular order. In one embodiment, the selected data sorting option is a sort-by-rank option. When a sort-by-rank option is selected then the data is sorted based on determined rank values of the data. In one embodiment, when the sort-by-rank option is selected then the data is sorted such that a data value with a higher rank value is positioned ahead of a data value with a lower rank value. A user at a client system may login into a service, for example, enterprise search service, provided by SAP® SE and select the sort-by-rank option.

Next a check is performed to determine whether a search query is received (304). The search query may be received from the user at a user interface. The user interface may be a search application user interface that enables a user to define search criteria, to execute the search, and to display the search results. In case, a search query is not received, (condition in 304 is false) then the rank value computation data corresponding to an object type is forwarded to a database engine (306). When the user logs into a client system then a rank value computation data, mapped to the user, is forwarded to the database engine. In one embodiment, the rank value computation data is forwarded to the database engine using a SQL SELECT statement. A SELECT statement is used to select data from a database. The result of the SELECT table may be stored in a result table. In one embodiment, the results of the SELECT statement are rank values of the data that is requested to be received.

The SELECT statement may transfer the rank value computation data in a WHERE clause. A WHERE clause is used to extract records that fulfill a specified criterion. The criterion in this case is the rank value computation data. For example, the rank value computation data corresponding to a "customer" object type may be ((customer first name=joh* and customer second name=peter)*0.8), where 0.8 is the relative weight of the object type. The rank influencing parameter (customer first name=joh* and customer second name=peter) may be defined to determine rank values of the different customers in the database. This rank influencing parameter along with the corresponding weight is transferred in a Select statement to the database engine. In one embodiment, a CONTAINS expression is used to transfer the rank value computation data. CONTAINS is a predicate of WHERE clause that performs a search based on the condition included in the CONTAINS expression. For example the Select statement may be:

SELECT id attribute 1 $rank TOP 10 from Tab_A WHERE CONTAINS (*, *, ((customer first name=joh* and customer second name=peter)*0.8))).

This Select statement returns the 10 highest ranked values of customers, from the different customer names stored in a table (TAB_A), based on the defined rank value computation data. The CONTAINS clause searches for customers having a first name "Joh*" and a second name "peter" from the list of customer names stored in a table (TAB_A). In one embodiment, the rank value computation data is transferred to an SQL-engine or an in-memory database engine, for example SAP® HANA database provided by SAP® SE.

When no search request is received then the rank value computation data is transferred by dummy-CONTAINS expression. In one embodiment, the rank value computation data may be transferred in an expression other than the CONTAINS expression. This ensures that the computation of rank value is independent of receiving a search query Next rank values are computed based on the search-independent rank influencing parameters included in the received rank value computation data (308). The rank value computation data received in the SELECT statement is analyzed to determine search-independent parameters from the different rank influencing parameters. The weights corresponding to the search-independent rank influencing parameters are then used for computing the rank values. The rank value may be received in a database column from the database engine. Next the data values corresponding to the object type are arranged based on the computed rank values (310). In one embodiment, the data may be arranged such that data values having a higher rank value are arranged higher in order compared to data values with lower rank value. For example, when the computed rank value for data 1 is 0.2, computed rank value for data 2 is 0.1, and the computer rank value of data 3 is 0.6 then the data values may be arranged as data 3, data 1, and data 2 based on the rank values. In one embodiment, a search API, for example an Enterprise search provided by SAP® SE, or an HTTP-service-bridge, for example Semantic Application Design Language (SADL) provided by SAP® SE, may be used for arranging the data based on the rank values.

The data values may be arranged in any other order depending on the rank values. Arranging data based on user defined rank value computation data provides greater flexibility to a user when using a search application solution. In existing enterprise search application, a user is allowed to select values for only some fixed set of fields, for example object type, based on which the data results are arranged are then displayed to the user. In one embodiment, the present solution allow a user to define rank value condition data based on any rank influencing parameters and these parameters are then used to arrange the data. This provides a greater flexibility to a user for receiving arranged data compared to existing enterprise search solutions. The arranged data may then be displayed (312). In one embodiment, the arranged data may be displayed on a user interface of the client device.

Next in case a search query is received (condition in 304 is true) from a user then the rank value computation data corresponding to an object type is forwarded to the database engine (314). The rank value computation data may be mapped to a user accessing the client system. The rank values are then computed based on the forwarded rank value computation data (316). As the search query has been received, the rank values are computed based on the weights of both the search-independent and search-dependent rank influencing parameters. The data corresponding to the object types are then arranged based on the arranged data values (318). The arranged data is then displayed to a user (320).

Figure 4:
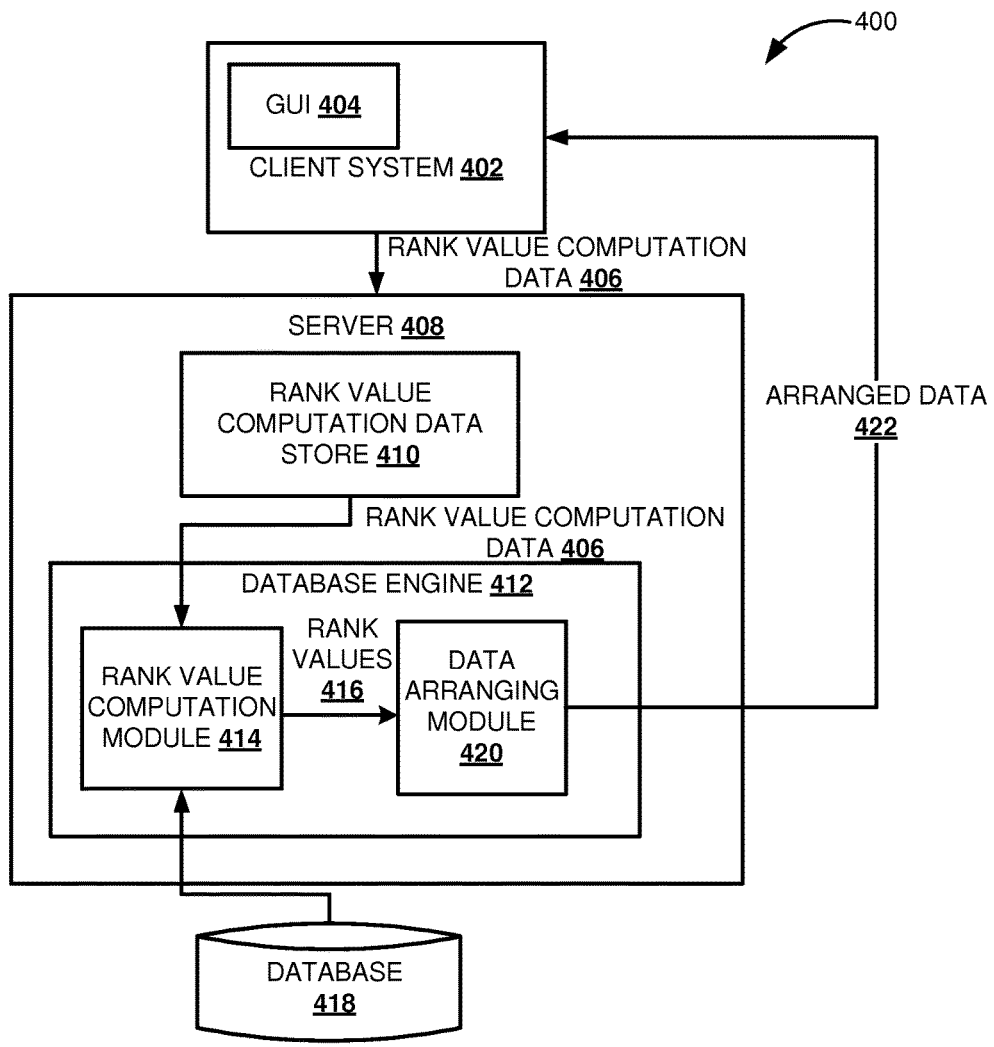
FIG. 4 is a block diagram illustrating a system for search independent ranking and arranging data, according to an embodiment.

FIG. 4 is a block diagram illustrating a system 400 for search independent ranking and arranging data, according to an embodiment. The system includes a client system 402 that allows a user to login into the system and provide rank value computation data on a Graphical user interface (GUI) 404. The rank value computation data 406 may be corresponding to an object type. The rank value computation data 406 may then be forwarded to a server 408. The received rank value computation data 406 is stored in a rank value computation data store 410, included in the server 408. In one embodiment, when the user is logged in at the client system then the rank value computation data 406 is forwarded from the rank value computation data store 410 to a database engine 412. The rank value computation data 408 may be forwarded to a rank value computation module 412 that computes rank value based on the received rank value computation data 406.

The rank value computation module 414 uses the weights of the rank influencing parameters included in the rank value computation data to compute rank values 416 for data corresponding to the object type, stored in the database 418. The computed rank values 416 and the corresponding data are then forwarded to a data arrangement module 420 that uses the determined rank values to arrange the data. The arranged data 422 is then forwarded to the client system 402 that displays it on the GUI 404.

Figure 5:
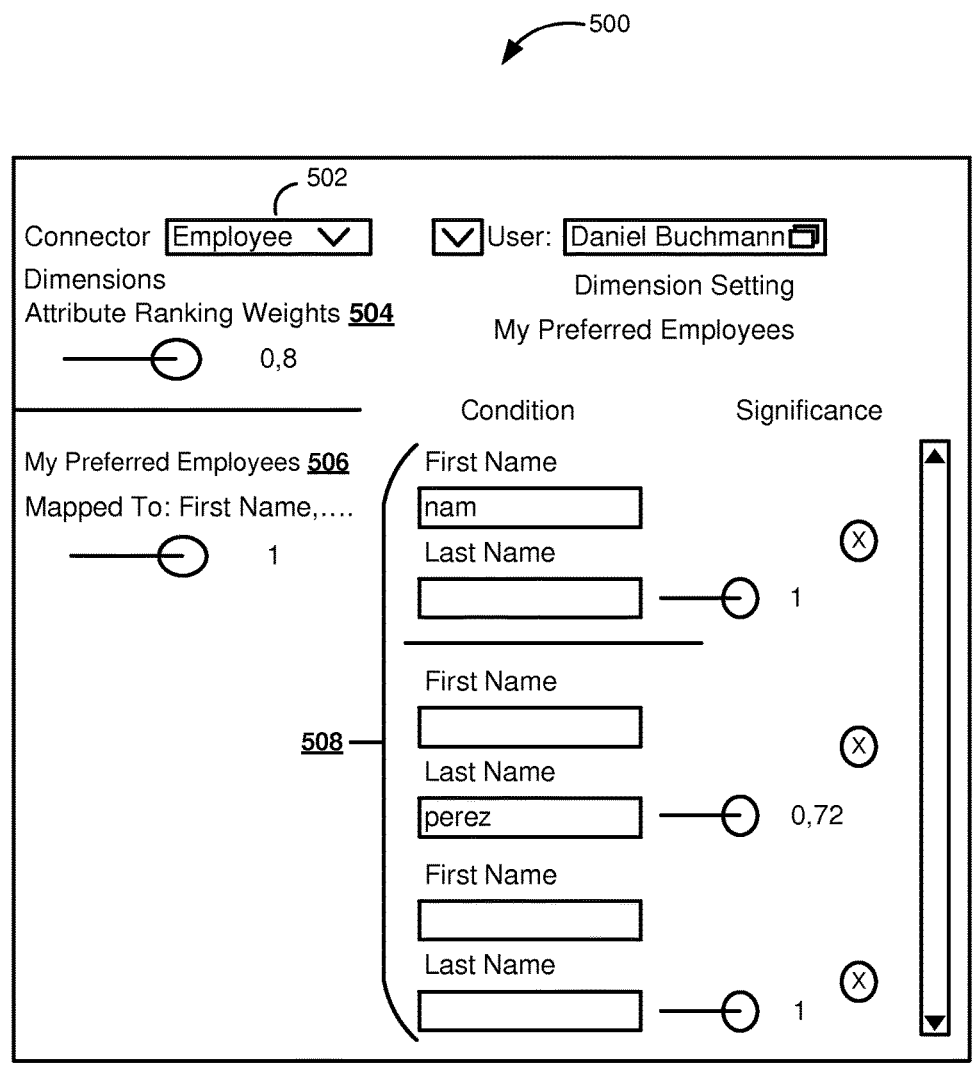
FIG. 5 is an exemplary screenshot of a user interface displaying rank value computation data, according to an embodiment

FIG. 5 is an exemplary screenshot of a user interface 500 displaying rank value computation data, according to an embodiment. In one embodiment, the rank value computation data may be received for a particular object type. In this case, the rank value computation data is received for an object type "employee" 502. The received rank value computation data for the object type "employee" includes two rank influencing parameters "attribute ranking weights" 504 and "My preferred employees" 506 along with their corresponding weight 0.8 and 1, respectively. The rank influencing parameter "my preferred employees" 506 is further defined to include three sub-rank influencing parameters 508 ("First Name=Nam" and "Last Name="), ("First Name=" and "Last Name=Perez"), and ("First Name=" and "Last Name=") and their corresponding weights 1, 0.72, and 1, respectively. The employee names corresponding to the "employee" object type are ranked based on the weights of the rank influencing parameters 504, 506 and the sub-rank influencing parameters 508. For example, rank value for an employee name "Nam" may be determined based on the weights of the rank-influencing parameter "attribute ranking weight" 504 and "My preferred employees" 506 and the weight of the sub-rank influencing parameter ("First Name=Nam" and "Last Name=").

FIG. 6 is a screenshot of a user interface 600 displaying employee names arranged based on rank value computation data of FIG. 5, according to an embodiment. The rank value computed from the rank value computation data is used to arrange the employee names, such that employee name having a higher rank value are ordered higher compared to the employee name having a lower rank value.

Some embodiments may include the above-described methods being written as one or more software components. These components, and the functionality associated may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
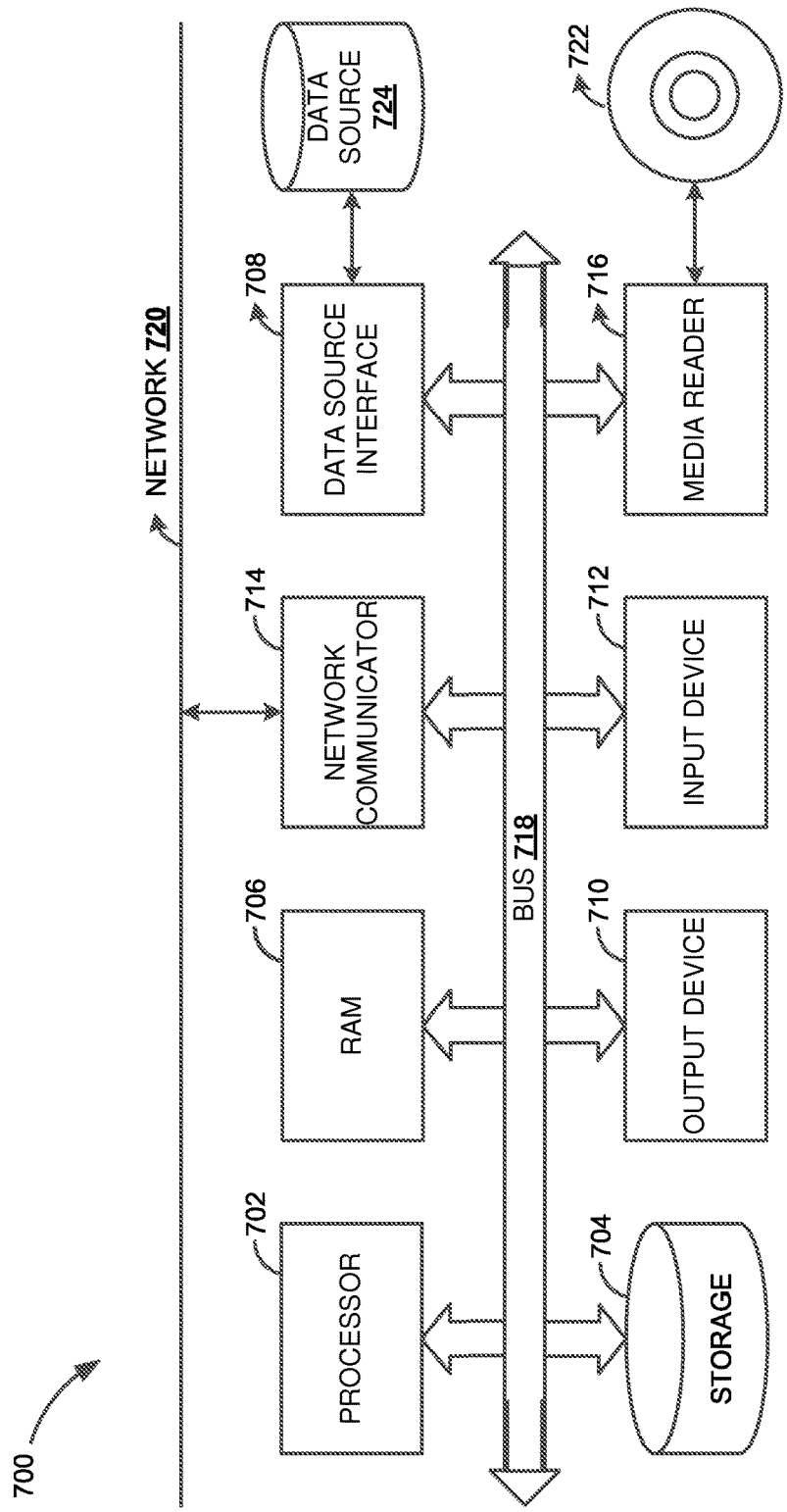
FIG. 7 is a block diagram illustrating a computing environment for search-independent ranking and arranging data, according to an embodiment.

FIG. 7 is a block diagram of an exemplary computer system 700. The computer system 700 includes a processor 702 that executes software instructions or code stored on a computer readable storage medium 722 to perform the above-illustrated methods of the invention. The computer system 700 includes a media reader 716 to read the instructions from the computer readable storage medium 722 and store the instructions in storage 704 or in random access memory (RAM) 706. The storage 704 provides a large space for keeping static data where at least some instructions could be stored for later execution. The stored instructions may be further compiled to generate other representations of the instructions and dynamically stored in the RAM 706. The processor 702 reads instructions from the RAM 706 and performs actions as instructed. According to one embodiment, the computer system 700 further includes an output device 710 (e.g., a display) to provide at least some of the results of the execution as output including, but not limited to, visual information to users and an input device 712 to provide a user or another device with means for entering data and/or otherwise interact with the computer system 700. Output devices 710 and input devices 712 could be joined by one or more additional peripherals to further expand the capabilities of the computer system 700. A network communicator 714 may be provided to connect the computer system 700 to a network 720 and in turn to other devices connected to the network 720 including other clients, servers, data stores, and interfaces, for instance. The modules of the computer system 700 are interconnected via a bus 718. Computer system 700 includes a data source interface 708 to access data source 724. The data source 724 can be accessed via one or more abstraction layers implemented in hardware or software. For example, the data source 724 may be accessed by network 720. In some embodiments the data source 724 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for a search-independent ranking and arranging of a plurality of data values, the method comprising:

at a database engine, receiving a forwarded rank value computation data, wherein the rank value computation data is received from a user interface, and wherein the received rank value computational data comprises a plurality of rank influencing parameters and weights associated with the plurality of rank influencing parameters;

at the database engine, computing a plurality of rank values for the plurality of data values corresponding to an object type based on the forwarded rank value computation data, wherein the computation of the plurality of rank values is independent of receiving a search query and wherein the rank value is computed in a non-cascading manner;

arranging the plurality of data values corresponding to the object type based on the computed plurality of rank values; and providing, to a client system, instructions to display the arranged data, wherein the instruction to display the arranged data includes instructions to display the data in a same order for different users.

2. The computer implemented method according to claim 1, further comprising:

at a user interface, receiving a user login information;

based on the received user login information, identifying the rank value computation data corresponding to the user login information; and forwarding the identified rank value computation data to the database engine.

3. The computer implemented method according to claim 1, wherein arranging the plurality of data values corresponding to the object type comprises:

receiving selection of a sort-by-rank option from the plurality of sorting options; and based on the received selection, arranging the plurality of data values corresponding to the object type based on the computed plurality of rank values.

4. The computer implemented method according to claim 1, wherein receiving the forwarded rank value computation data comprises:

receiving a plurality of rank influencing parameters and a plurality of relative weights corresponding to the plurality of rank influencing parameters, wherein the plurality of rank influence parameters comprises a plurality of search-dependent rank influence parameters and a plurality of search-independent rank influence parameters.

5. The computer implemented method according to claim 4, wherein computing the plurality of rank values comprises:

determining whether a search query is received; and based on a determination result that the search query is not received, computing the plurality of rank values based on the plurality of search-independent rank influencing parameters, from the plurality of rank influencing parameters.

6. The computer implemented method according to claim 4, wherein computing the plurality of rank values comprises:

receiving, at a user interface, a search query; and based on a determination result that the search query is received, computing the plurality of rank values based on the plurality of search-dependent rank influence parameters and the plurality of search-independent rank influence parameters of the plurality of rank influencing parameters.

7. The computer implemented method according to claim 1, further comprising:

determining whether a rank influencing parameter, from a plurality of rank influencing parameters, corresponding to a plurality of data identifiers is a search-dependent rank influencing parameter; and processing the search-dependent rank influencing parameter when a search request is received.

8. The computer implemented method according to claim 1, wherein receiving the forwarded rank-value computation data includes:

receiving a Sequential Query Language (SQL) statement including a plurality of rank influencing parameters and a plurality of weights corresponding to the rank influencing parameters.

9. The computer implemented method according to claim 1, further comprising:
receiving, at a user interface, a rank value computation data; and
forwarding the rank value computation to the database engine.

10. A non-transitory computer readable medium to store instructions, which when executed by a computer, cause the computer to:
at a database engine, receiving a forwarded rank value computation data, wherein the rank value computation data is received from a user interface, and wherein the received rank value computational data comprises a plurality of rank influencing parameters and weights associated with the plurality of rank influencing parameters;
at the database engine, computing a plurality of rank values for the plurality of data values corresponding to an object type based on the forwarded rank value computation data, wherein the computation of the plurality of rank values is independent of receiving a search query and wherein the rank value is computed in a non-cascading manner;
arranging the plurality of data values corresponding to the object type based on the computed plurality of rank values; and
providing, to a client system, instructions to display the arranged data, wherein the instruction to display the arranged data includes instructions to display the data in a same order for different users.

11. The non-transitory computer readable medium according to claim 10, further comprising instructions which when executed by the computer further causes the computer to:
receive a user login information;
based on the received user login information, identify the rank value computation data corresponding to the user login information; and
forward the identified rank value computation data to the database engine.

12. The non-transitory computer readable medium according to claim 10, further comprising instructions which when executed by the computer further causes the computer to:
receive selection of a sort-by-rank option from the plurality of sorting options; and
based on the received selection, arrange the plurality of data values corresponding to the object type based on the computed plurality of rank values.

13. The non-transitory computer readable medium according to claim 10, further comprising instructions which when executed by the computer further causes the computer to:
receive a plurality of rank influencing parameters and a plurality of relative weights corresponding to the plurality of rank influencing parameters, wherein the plurality of rank influence parameters comprises a plurality of search-dependent rank influence parameters and a plurality of search-independent rank influence parameters.

14. The non-transitory computer readable medium according to claim 13, further comprising instructions which when executed by the computer further causes the computer to:
determine whether a search query is received; and
based on a determination result that the search query is not received, computing the plurality of rank values based on the plurality of search-independent rank influencing parameters, from the plurality of rank influencing parameters.

15. The non-transitory computer readable medium according to claim 13, further comprising instructions which when executed by the computer further causes the computer to:
receive a search query; and
based on a determination result that the search query is received, computing the plurality of rank values based on the plurality of search-dependent rank influence parameters and the plurality of search-independent rank influence parameters of the plurality of rank influencing parameters.

16. A computer system for a search-independent ranking and arranging of a plurality of data values, the computer system comprising:
a memory to store program code; and
a processor communicatively coupled to the memory, the processor to execute the program code, the program code comprising:
at a database engine, receiving a forwarded rank value computation data, wherein the rank value computation data is received from a user interface, and wherein the received rank value computational data comprises a plurality of rank influencing parameters and weights associated with the plurality of rank influencing parameters;
at the database engine, computing a plurality of rank values for the plurality of data values corresponding to an object type based on the forwarded rank value computation data, wherein the computation of the plurality of rank values is independent of receiving a search query and wherein the rank value is computed in a non-cascading manner;
arranging the plurality of data values corresponding to the object type based on the computed plurality of rank values; and
providing, to a client system, instructions to display the arranged data, wherein the instruction to display the arranged data includes instructions to display the data in a same order for different users.

17. The computer system according to claim 16, wherein the program code further comprises:
receive a user login information;
based on the received user login information, identify the rank value computation data corresponding to the user login information; and
forward the identified rank value computation data to the database engine.

18. The computer system according to claim 16, wherein arranging the plurality of data values corresponding to the object type comprises:
receive selection of a sort-by-rank option from the plurality of sorting options; and
based on the received selection, arrange the plurality of data values corresponding to the object type based on the computed plurality of rank values.

19. The computer system according to claim 16, wherein receiving the forwarded rank value computation data comprises:
  receive a plurality of rank influencing parameters and a plurality of relative weights corresponding to the plurality of rank influencing parameters, wherein the plurality of rank influence parameters comprises a plurality of search-dependent rank influence parameters and a plurality of search-independent rank influence parameters.

20. The computer system according to claim 19, wherein computing the plurality of rank values comprises:
  determine whether a search query is received; and
  based on a determination result that the search query is not received, computing the plurality of rank values based on the plurality of search-independent rank influencing parameters, from the plurality of rank influencing parameters.

* * * * *